(12) United States Patent
Calia et al.

(10) Patent No.: US 6,223,652 B1
(45) Date of Patent: *May 1, 2001

(54) KITCHEN APPLIANCE COMPRISING A CONTAINER WITH A FILTER

(75) Inventors: Edgard G. Calia, Drachten; Henk S. De Jong, Groningen, both of (NL)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,482

(22) Filed: May 12, 1999

(30) Foreign Application Priority Data

May 15, 1998 (EP) .................................................. 98201621

(51) Int. Cl.$^7$ ................................ A23N 1/00; B01F 7/24; B02C 15/00; B04B 5/10
(52) U.S. Cl. ............................... 99/513; 99/501; 366/205; 366/314; 241/73
(58) Field of Search .................................... 366/205, 306, 366/302, 314; 241/24.16, 24.26, 69, 70, 73, 74; 99/348, 509, 510, 513, 501–503; 210/178

(56) References Cited

U.S. PATENT DOCUMENTS

| | | | |
|---|---|---|---|
| D. 375,024 | * 10/1996 | Pursley | 366/314 |
| 33,973 | * 12/1861 | Goewey | 366/205 |
| 2,785,547 | * 3/1957 | Barros | 241/205 |
| 3,612,125 | * 10/1971 | Krauth | 366/205 |
| 5,289,763 | 3/1994 | Le Rouzic et al. | 99/503 |
| 5,433,144 | 7/1995 | Lee | 99/512 |
| 5,636,923 | * 6/1997 | Nejat-Bina | 366/205 |
| 5,662,032 | * 9/1997 | Baratta | 366/205 |
| 5,690,021 | 11/1997 | Grey | 99/513 |
| 6,135,019 | * 10/2000 | Chou | 366/314 |

* cited by examiner

Primary Examiner—Tony G. Soohoo
(74) Attorney, Agent, or Firm—Ernestine C. Bartlett

(57) ABSTRACT

The invention relates to a kitchen appliance comprising a container and a housing accommodating an electric motor. The container comprises a bottom, a removable lid, and a bearing for supporting a tool which is drivable in the container by the motor. A filter can be placed in the container around the tool and can be filled with ingredients such as fruits or vegetables. After activation of the tool, liquids and juices are obtained from these ingredients which pass through strainer openings of the filter. According to the invention, the filter is held in a fixed position in the container during operation in that the filter is locked in between the bottom and the lid of the container. In a first embodiment of the kitchen appliance, the filter is locked in between the bottom and the lid of the container in that the filter has a length which substantially corresponds to a distance between the bottom and the lid of the container. In a second embodiment of the kitchen appliance, the filter is locked in between the bottom of the container and a supporting element which is locked in between the filter and the lid of the container. In a third embodiment of the kitchen appliance, said supporting element comprises a funnel via which a filter chamber of the filter can be filled.

16 Claims, 3 Drawing Sheets

KITCHEN APPLIANCE COMPRISING A CONTAINER WITH A FILTER

BACKGROUND OF THE INVENTION

The invention relates to a kitchen appliance comprising a container and a housing accommodating an electric motor, said container having a bottom, a removable lid, a bearing for supporting a tool which is drivable in the container by the motor, and a filter which is placeable in the container around the tool.

The invention further relates to a container which is suitable for use in a kitchen appliance according to the invention.

The invention also relates to a filter which is suitable for use in the container of a kitchen appliance according to the invention.

A kitchen appliance of the kind mentioned in the opening paragraph is known from U.S. Pat. No. 5,690,021. The known kitchen appliance is an electrical blender, the container of the known kitchen appliance comprising a mixing chamber which is secured to a blender base. The tool of the known kitchen appliance comprises a number of blender blades and is rotatably journalled in the blender base. The filter of the known kitchen appliance comprises a cylindrical chamber which is open at both ends and has strainer openings about a portion of its circumference. A bottom end of the filter comprises a mounting base attachment by means of which the filter can be attached to a mounting base of the container which is attached to the blender base. In the embodiment shown in the patent, the mounting base and the mounting base attachment comprise threads which are mutually attachable. When the filter is attached to the mounting base, the filter is completely contained in the mixing chamber of the container and encloses the tool. Items such as fruits or vegetables are then placed in the chamber of the filter and an open top end of the filter is closed with a lid. When the known kitchen appliance is activated, the tool chops or cuts the items into solid pieces and produces a liquid. The liquid passes through the strainer openings of the filter and can subsequently be poured out of the container.

A disadvantage of the known kitchen appliance is that the filter used therein can be attached to the container by a user of the appliance only with difficulty. In order to attach the filter to the container, the user has to bring the filter into the container through the open top end of the container and fasten the mounting base attachment of the filter to the mounting base of the container, which is present near the bottom of the container, while holding the filter through the open top end of the container.

SUMMARY OF THE INVENTION

It is an object of the present invention to provide a kitchen appliance of the kind mentioned in the opening paragraph wherein the filter used therein can be attached into the container by a user of the kitchen appliance without appreciable difficulty.

The kitchen appliance according to the invention is for this purpose characterized in that the filter is held in a fixed position in the container during operation by way of locking said filter in between the bottom and the lid of the container. In order to attach the filter to the container of the kitchen appliance according to the invention, the user merely has to bring the filter into the container and to place the filter on the bottom of the container. Subsequently, the filter is locked in between the bottom and the lid of the container when the user closes the container with said lid. In this manner, the filter is attached to the container by the user in a very simple way. Since the filter is held in a fixed position in the container during operation in that the filter is locked in between the bottom and the lid of the container, no additional attaching means are necessary for attaching the filter to the container, so that the construction of the container and the filter is simplified.

A particular embodiment of a kitchen appliance according to the invention is characterized in that the filter has a length which substantially corresponds to a distance between the bottom and the lid of the container. In this particular embodiment of a kitchen appliance according to the invention, no additional supporting means are necessary to lock in the filter between the bottom and the lid of the container, so that the construction of the container and the filter is further simplified and the number of individual parts of the kitchen appliance is reduced.

A special embodiment of a kitchen appliance according to the invention is characterized in that the filter has a removable lid which is incorporated in the lid of the container. Since the lid of the filter is incorporated in the lid of the container, no separate lid is needed for the filter, so that the number of individual parts of the kitchen appliance is reduced.

A further embodiment of a kitchen appliance according to the invention is characterized in that the filter is held in a fixed position in the container during operation by means of a supporting element present between the filter and the lid of the container. As a result of the use of the supporting element, the filter can have a length which is independent of the distance between the bottom and the lid of the container. In this manner, a filter can be used having a length which is adapted to a quantity of food or beverage to be prepared. The supporting element comprises, for example, a hollow cylindrical body or a number of supporting rods.

A yet further embodiment of a kitchen appliance according to the invention is characterized in that the supporting element is integrated with a lid of the filter. Since the supporting element is integrated with the lid of the filter, the number of individual parts of the kitchen appliance is reduced. In addition, it is prevented that the user of the kitchen appliance forgets to place the supporting element on the filter before closing the container with the lid of the container.

A particular embodiment of a kitchen appliance according to the invention is characterized in that the supporting element comprises a funnel via which a volume in the container enclosed by the filter can be filled. As a result of the use of said funnel as the supporting element for locking the filter between the bottom and the lid of the container, a very practical construction of the kitchen appliance is achieved. After having placed the filter and the funnel in the container, the volume in the container enclosed by the filter can be filled via the funnel, so that spilling of ingredients beside the filter is prevented as much as possible when the user fills the filter.

A special embodiment of a kitchen appliance according to the invention is characterized in that the funnel is integrated with a housing carrying the filter. Since the funnel is integrated with the housing of the filter, the number of individual parts of the kitchen appliance is reduced. In addition, it is prevented that the user of the kitchen appliance forgets to place the funnel on the filter before closing the container with the lid of the container.

A further embodiment of a kitchen appliance according to the invention is characterized in that the lid of the container comprises an opening via which the funnel is accessible. Since the lid of the container is provided with said opening, the filter can be filled by the user after the container has been closed with the lid and the filter has been locked in between the bottom and the lid of the container. In this manner, it is prevented that the filter is displaced in the container during filling.

BRIEF DESCRIPTION OF THE DRAWINGS

The invention will be explained in more detail below with reference to the drawing, in which FIG. 1 diagrammatically shows a first embodiment of a kitchen appliance according to the invention, FIG. 2 diagrammatically shows a second embodiment of a kitchen appliance according to the invention, and FIG. 3 diagrammatically shows a third embodiment of a kitchen appliance according to the invention.

DESCRIPTION OF THE PREFERRED EMBODIMENTS

Figure 1:
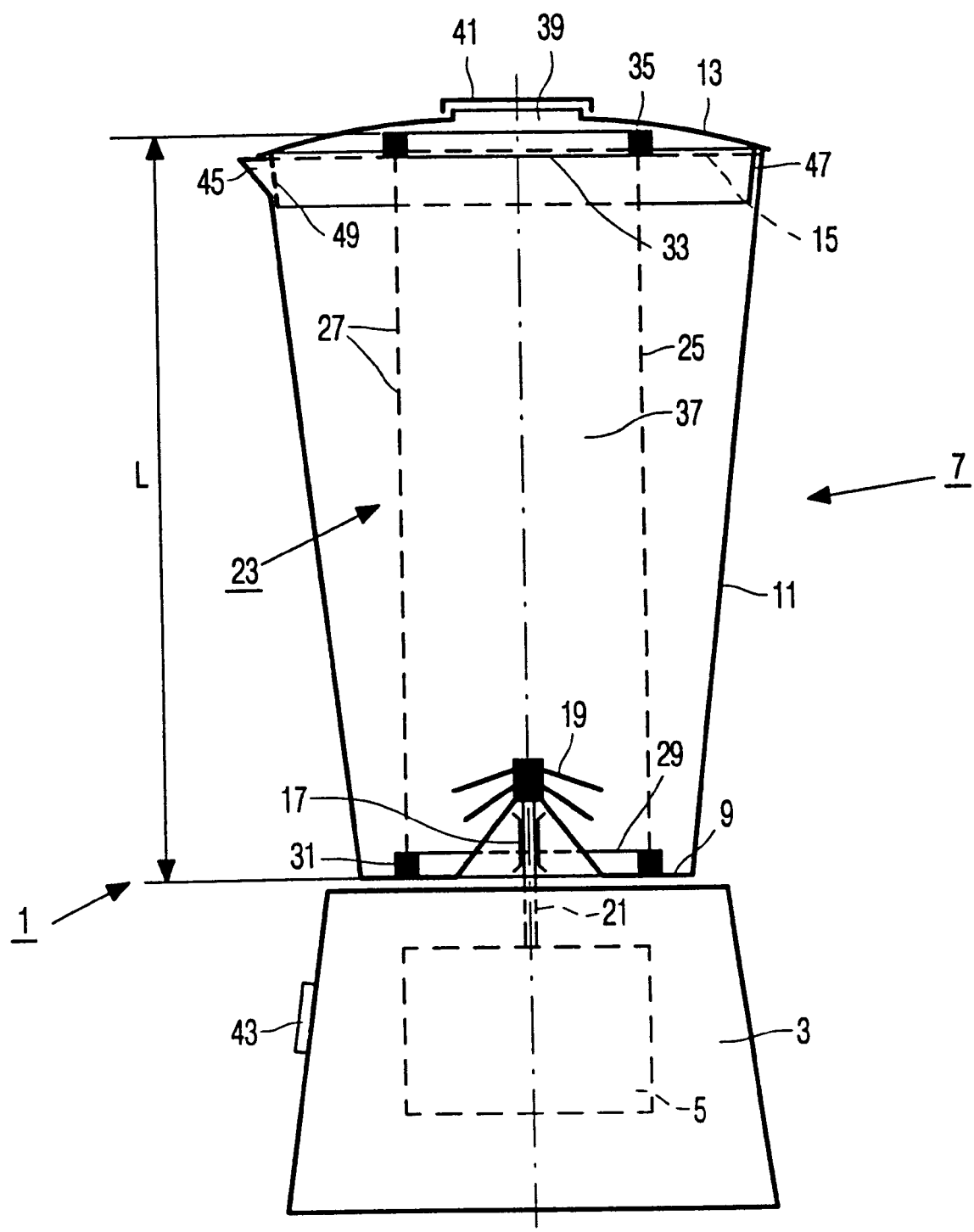

FIG. 1 diagrammatically shows a first embodiment of a kitchen appliance 1 according to the invention. The kitchen appliance 1 comprises a housing 3 which can be placed on a table and accommodates an electric motor 5. The kitchen appliance 1 further comprises a container 7 made from a transparent synthetic material and having a bottom 9, a substantially rotationally symmetrical side wall 11, and a removable lid 13 which closes an open upper end 15 of the container 7. The bottom 9 of the container 7 comprises a bearing 17 which supports a tool 19 of the container 7. The tool 19 is rotatably journalled in the container 7 by means of the bearing 17 and is drivable by means of the motor 5. The container 7 of the kitchen appliance 1 is a jar which is placed on the housing 3. It is noted, however, that the invention also relates to other types of kitchen appliances such as, for example, kitchen appliances in which the container is a bowl which is placed on a flat base part of the appliance adjacent a motor housing of the appliance. It is further noted, that the invention relates both to kitchen appliances in which the container is permanently fastened to the housing and to kitchen appliances in which the container is removably coupled to the housing. The tool 19 of the kitchen appliance 1 is a blending tool which is permanently journalled in the container 7 and is directly coupled to a motor shaft 21 of the motor 5. It is noted, however, that the invention also relates to kitchen appliances in which the tool is of a different type, to kitchen appliances in which the tool can be removed from the container, and to kitchen appliances in which the tool is driven by the motor via a transmission.

As FIG. 1 further shows, the container 7 comprises a filter 23 which is placeable in the container 7 around the tool 19. The filter 23 comprises a circular cylindrical filter element 25 which is shown diagrammatically only in FIG. 1, which element is made from a metal or from a synthetic material, and comprises strainer openings 27. A first open end 29 of the filter element 25 is fastened to a first positioning ring 31 of the filter 23, while a second open end 33 of the filter element 25 is fastened to a second positioning ring 35 of the filter 23. The filter 23 can be removed from the container 7 by a user of the kitchen appliance 1 after removal of the lid 13 from the container 7. As FIG. 1 shows, the filter 23 has a length L which substantially corresponds to a distance between the bottom 9 and the lid 13 of the container 7 when the lid 13 is in a correct position on the container 7 and closes the open upper end 15 of the container 7. In this manner, the filter 23 is held in a fixed position in the container 7 during operation in that the filter 23 is locked in between the bottom 9 and the lid 13 of the container 7, the first positioning ring 31 of the filter 23 resting against the bottom 9 of the container 7, and the second positioning ring 35 of the filter 23 resting against the lid 13 of the container 7. When the user of the kitchen appliance 1 wants to place the filter 23 in, and attach it to the container 7, the user merely has to introduce the filter 23 into the container 7 and to place the filter 23 with its positioning ring 31 on the bottom 9 of the container 7. Subsequently, the user merely has to close the container 7 with the lid 13, whereby the filter 23 is locked in between the bottom 9 and the lid 13 of the container 7 and attached in a fixed position in the container 7. In this manner, the user can attach the filter 23 to the container 7 in a very simple way without appreciable difficulty. Since the filter 23 is held in a fixed position in the container 7 during operation in that the filter 23 is locked in between the bottom 9 and the lid 13 of the container 7, no additional attaching means are necessary for attaching the filter 23 to the container 7, so that the container 7 and the filter 23 are of simple construction. Since the length L of the filter 23 substantially corresponds to the distance between the bottom 9 and the lid 13 of the container 7, no additional supporting means are necessary to lock in the filter 23 between the bottom 9 and the lid 13 of the container 7, so that the number of individual parts of the kitchen appliance 1 is reduced and the construction of the kitchen appliance 1 is further simplified.

The circular cylindrical filter element 25 of the filter 23 encloses a filter chamber 37 which can be filled by the user of the kitchen appliance 1 with ingredients such as, for example, fruits or vegetables when the filter 23 is present in the container 7. The filter chamber 37 can, for example, be filled with said ingredients before the lid 13 is placed on the container 7. However, as FIG. 1 shows, the lid 13 of the container 7 is provided with a central opening 39 which can be closed by a further lid 41 which is relatively small and constitutes a removable lid for the filter 23. As a result of the use of the further lid 41, the filter chamber 37 can be filled with the ingredients after the lid 13 of the container 7 has been placed on the container 7 and the filter 23 has been locked in between the bottom 9 and the lid 13 of the container 7. In this manner, it is prevented that the filter 23 is displaced in the container 7 during filling. In the embodiment of the kitchen appliance 1 shown in figure 1, the further lid 41 constitutes a separate part of the lid 13 which can be completely removed from the lid 13. In a preferred modification of the kitchen appliance 1 not shown in the drawings, the further lid 41 for the filter 23 is incorporated in the lid 13 of the container 7 and is, for example, connected to the lid 13 via a hinge or an elastically deformable connecting element. In such a modification of the kitchen appliance 1, the number of individual parts of the kitchen appliance 1 is further reduced. It is noted, however, that the invention also relates to kitchen appliances in which the central opening 39 and the further lid 41 are omitted from the lid 13, so that the lid 13 completely closes the open upper end 15 of the container 7. In such a kitchen appliance, the filter 23 has to be filled with the ingredients before the container 7 is closed with the lid 13.

After the filter chamber 37 has been filled with the ingredients and the lid 13 and the further lid 41 have been placed in their closing positions, the kitchen appliance 1 is activated by starting the motor 5 by means of a switch 43 shown in FIG. 1. The tool 19 now chops or cuts the ingredients into solid pieces and also produces a liquid which passes through the strainer openings 27 of the filter element 25 into the portion of the container 7 outside the filter 23. The container 7 is further provided with a spout 45 via which said liquid can be poured out from the container 7 after being prepared. The lid 13 is provided with a collar 47 in which further strainer openings 49 are present. Preferably, the collar 47 comprises several sets of strainer openings 49 having mutually differing shapes and sizes which can be selected by turning the lid 13 relative to the container 7 in order to bring the desired set of strainer openings 49 before the spout 45. The kitchen appliance 1 is suitable for preparing, for example, soya milk. For this purpose, the filter chamber 37 is partly filled with soaked soya beans and the container 7 is partly filled with water. After activation of the kitchen appliance 1, soya milk is obtained in that soya bean liquid passes through the strainer openings 27 of the filter 23 and mixes with the water in the container 7.

Figure 2:
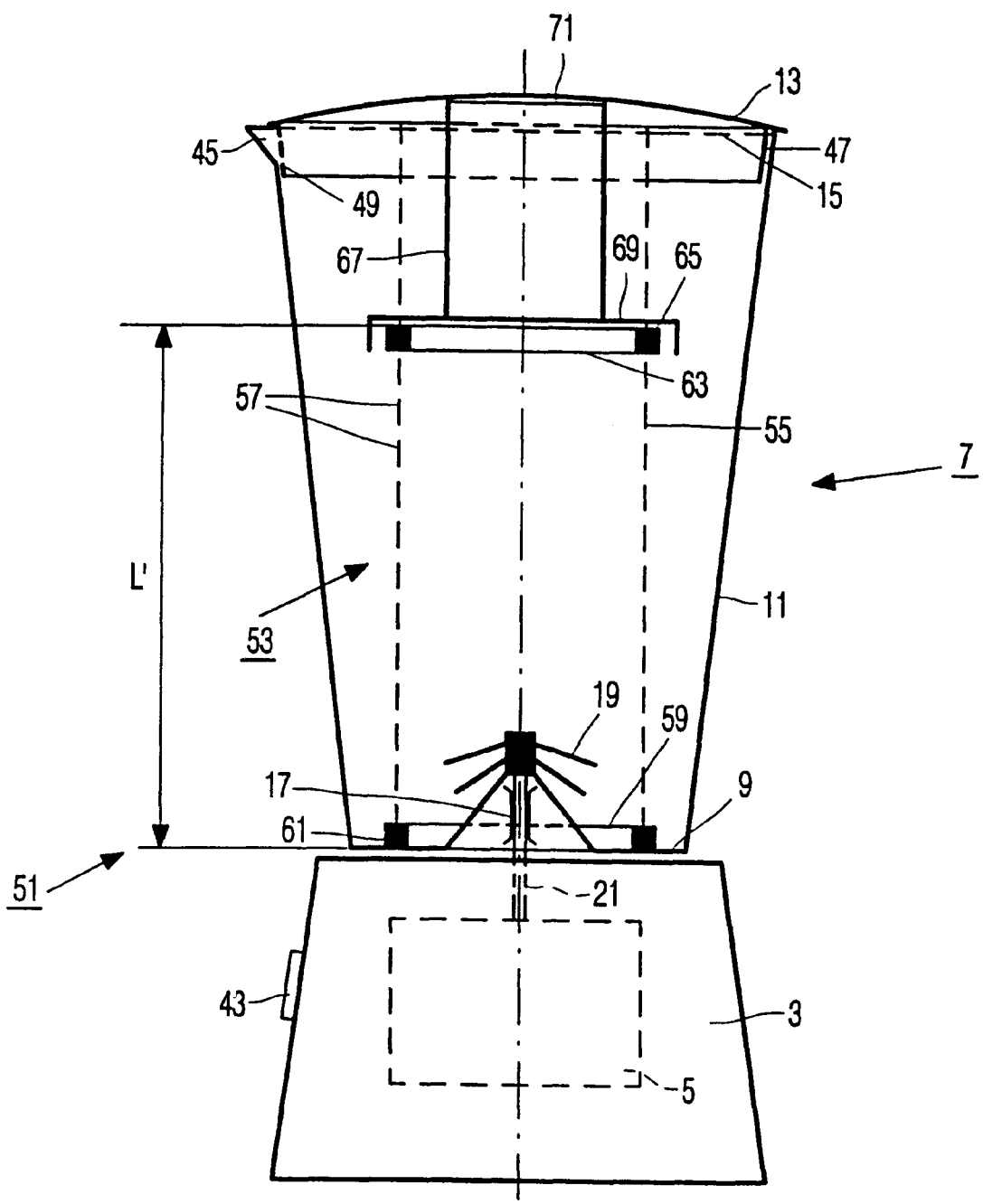

FIG. 2 diagrammatically shows a second embodiment of a kitchen appliance 51 according to the invention. Components of the kitchen appliance 51 which correspond to components of the kitchen appliance 1 according to the first embodiment discussed before are indicated in FIG. 2 with corresponding reference numbers. Hereafter, only the main differences between the kitchen appliances 1 and 51 will be discussed. As shown in FIG. 2, the kitchen appliance 51 comprises a filter 53 which is placeable in the container 7 around the tool 19. The filter 53 comprises a circular cylindrical filter element 55 with strainer openings 57. A first open end 59 of the filter element 55 is fastened to a first positioning ring 61 of the filter 53, while a second open end 63 of the filter element 55 is fastened to a second positioning ring 65 of the filter 53. The filter 53 has a length L' which is substantially smaller than a distance between the bottom 9 and the lid 13 of the container 7 when the lid 13 is in a correct position on the container 7 and closes the open upper end 15 of the container 7. As FIG. 2 shows, the filter 53 is held in a fixed position in the container 7 during operation in that the filter 53 is locked in between the bottom 9 of the container 7 and a supporting element 67 which is locked in between the filter 53 and the lid 13 of the container 7, the first positioning ring 61 of the filter 53 resting against the bottom 9 of the container 7, and the second positioning ring 65 of the filter 53 resting against a lid 69 of the filter 53. The supporting element 67 comprises a hollow circular cylindrical body having an upper edge 71 which rests against the lid 13 of the container 7. The supporting element 67 is integrated with the lid 69 of the filter 53, so that the number of individual parts of the kitchen appliance 51 is reduced. As a result of the use of the supporting element 67, the length L' of the filter 53 can be independent of the distance between the bottom 9 and the lid 13 of the container 7 and can, for example, be adapted to a quantity of food or beverage which is usually to be prepared by means of the kitchen appliance 51. It is noted, that the supporting element 67 may alternatively have another shape. For example, the supporting element 67 may alternatively comprise a number of supporting rods or a hollow body having another cross-section. It is further noted, that the supporting element 67 may alternatively be a separate part of the kitchen appliance 51 which has to be placed upon the filter 53 or upon the lid 69 of the filter 53 by the user before closing the container 7 with the lid 13. Furthermore, the supporting element 67 may alternatively be integrated with the lid 13 of the container 7 instead of with the lid 69 of the filter 53. In general, the chance that the user of the kitchen appliance 51 forgets to provide the supporting element 67 before closing the container 7 will be reduced if the supporting element 67 is integrated with the lid 13 of the container 7 or with the lid 69 of the filter 53.

Figure 3:
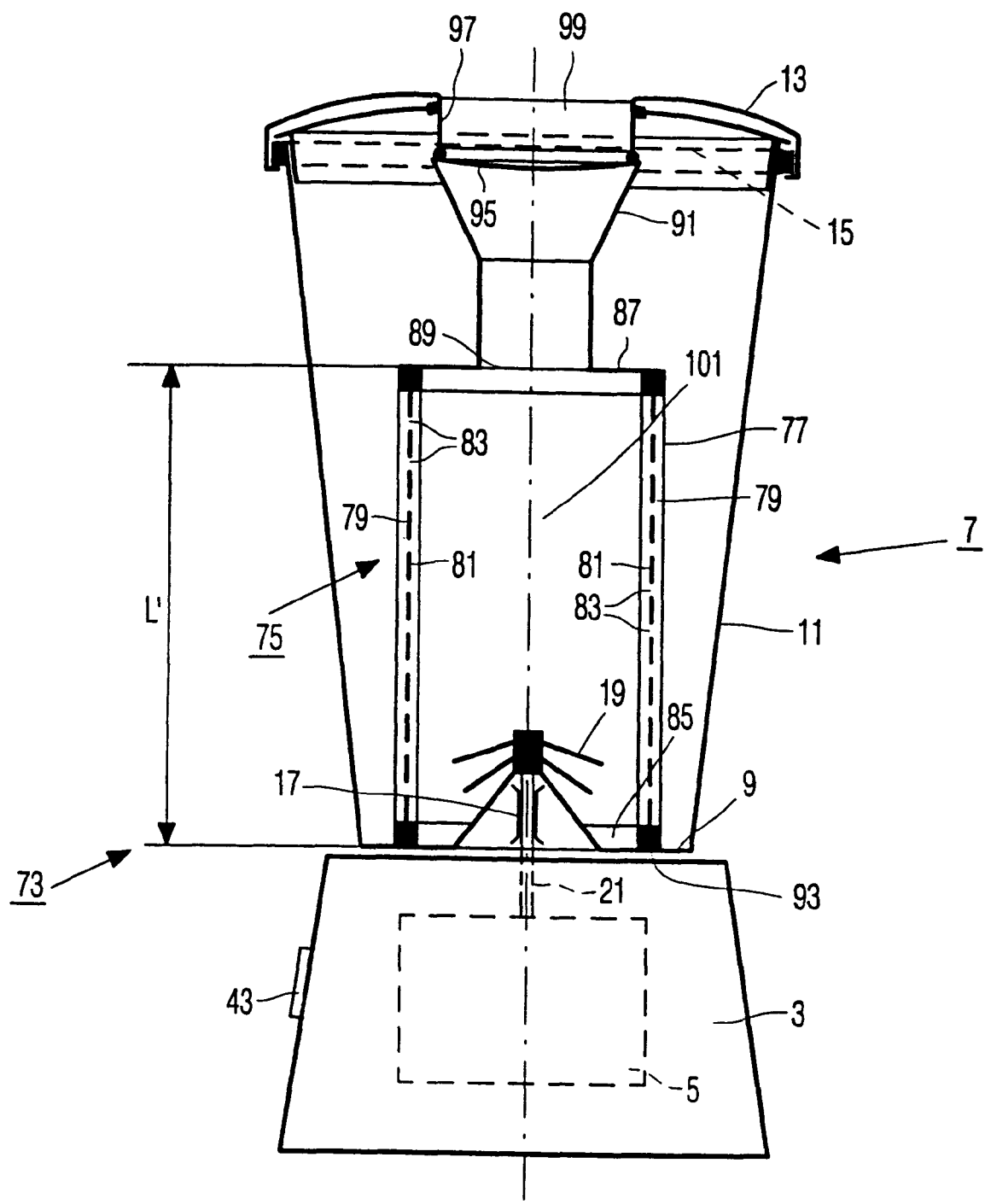

FIG. 3 diagrammatically shows a third embodiment of a kitchen appliance 73 according to the invention. Components of the kitchen appliance 73 which correspond to components of the kitchen appliance 1 according to the first embodiment and/or to components of the kitchen appliance 51 according to the second embodiment discussed before are indicated in FIG. 3 with corresponding reference numbers. Hereafter, only the main differences between the kitchen appliance 73 and the kitchen appliances 1, 51 will be discussed. As shown in FIG. 3, the kitchen appliance 73 comprises a filter 75 which is placeable in the container 7 around the tool 19. The filter 75 comprises a circular cylindrical filter housing 77 made from a synthetic material in which a number of elongate openings 79 are provided which substantially extend over the complete length L' of the filter housing 77. In each of the openings 79 of the filter housing 77, a filter element 81 with strainer openings 83 is provided. The filter elements 81 can, for example, be made from a metal or from a synthetic material. The length L' of the filter housing 77 is substantially smaller than a distance between the bottom 9 and the lid 13 of the container 7 when the lid 13 is in a correct position on the container 7 and closes the open upper end 15 of the container 7. As FIG. 3 shows, the filter housing 77 has an open lower end 85, an upper wall 87 with a central opening 89, and a filling funnel 91 which is connected to said central opening 89 and is integrated with the filter housing 77. The filter 75 is held in a fixed position in the container 7 during operation in that the filter housing 77 with the filling funnel 91 is locked in between the bottom 9 of the container 7 and the lid 13 of the container 7, a lower edge 93 of the filter housing 77 resting against the bottom 9 of the container 7, and an upper edge 95 of the filling funnel 91 resting against a support ring 97 of the lid 13 which is provided around a central opening 99 of the lid 13 via which the filling funnel 91 is accessible. Thus, the filling funnel 91 constitutes a supporting element by means of which the filter 75 is locked in between the bottom 9 and the lid 13 of the container 7. As a result of the use of the filling funnel 91, a very practical construction of the kitchen appliance 73 is achieved, wherein said supporting element has a double function. After having placed the filter 75 with the filling funnel 91 into the container 7 and having closed the container 7 with the lid 13, the user of the kitchen appliance 73 can fill a filter chamber 101 of the filter 75 via the filling funnel 91 and the central opening 99 in the lid 13 of the container 7, so that spilling of ingredients beside the filter 75 is prevented as much as possible when the user fills the filter 75. Since the filling funnel 91 is integrated with the filter housing 77, the number of individual parts of the kitchen appliance 73 is reduced. In addition, it is prevented that the user of the kitchen appliance 73 forgets to place the filling funnel 91 on the filter 75 before closing the container 7 with the lid 13. Since the lid 13 of the container 7 is provided with the central opening 99 via which the filling funnel 91 is accessible, the filter 75 can be filled by the user after the container 7 has been closed with the lid 13 and the filter 75 has been locked in between the bottom 9 and the lid 13 of the container 7. In this manner, it is prevented that the filter 75 is displaced in the container 7 during filling. It is noted, that the lid 13 may alternatively be provided with a further lid for closing the central opening 99. It is finally noted, that the filling funnel 91 may alternatively be integrated with the lid 13 of the container 7 instead of with the filter housing 77, and that the filling funnel 91 may alternatively constitute a separate part of the kitchen appliance 73 which is to be placed by the user between the filter 75 and the lid 13.

What is claimed is:

1. A kitchen appliance comprising a container and a housing accommodating an electric motor, said container having a bottom, a removable container lid, a bearing for supporting a tool which is drivable in the container by the motor, and a filter which is placeable in the container around the tool to rest against the lid of the container, wherein the filter, when placed in the container, dividing the space in the container between a portion in the filter and a portion outside of the filter, wherein the filter is held in a fixed position during operation by locking said filter between the bottom and the lid of the container in such a manner that a positioning right at the top portion of the filter solely rests against the lid and the bottom portion of the filter solely rests against the bottom of the container.

2. A kitchen appliance as claimed in claim 1, wherein the filter has a length which substantially corresponds to the distance between the bottom and the lid of the container.

3. A kitchen appliance as claimed in claim 2, wherein the filter has a removable lid which is incorporated in the lid of the container.

4. A kitchen appliance comprising a container and a housing accommodating an electric motor, said container having a bottom, a removable container lid, a bearing for supporting a tool which is drivable by the motor, and a filter which is placeable in the container around the tool, said filter, when placed in the container, dividing the space in the container between a portion in the filter and a portion outside of the filter, said filter being held in a fixed position during operation by locking said filter in between the bottom and the lid of the container, wherein the filter is held in the fixed position in the container during operation by means of a supporting element and a positioning ring present between the filter and the lid, of the container and the bottom portion of the filter solely rests against the bottom of the container.

5. A kitchen appliance as claimed in claim 4, wherein the supporting element is integrated with a lid of the filter.

6. A kitchen appliance as claimed in claim 4, wherein the supporting element comprises a funnel via which a volume in the container enclosed by the filter can be filled.

7. A kitchen appliance as claimed in claim 6 wherein, the funnel is integrated with a housing carrying the filter.

8. A kitchen appliance as claimed in claim 6 wherein the lid of the container comprises an opening via which the funnel is accessible.

9. A container suitable for use in a kitchen appliance, said container having a removable lid, a bottom for receiving a tool which is drivable in the container by a motor, and a filter which is placeable in the container around the tool so as to divide the space in the container between a portion inside the filter and a portion outside of the filter and to rest against the lid of the container, wherein the filter is held in a fixed position in the container during operation by locking said filter in between the bottom and the lid of the container in such a manner that a positioning ring at the top portion of the filter solely rests against the lid and the bottom portion of the filter solely rests against the bottom of the container.

10. A container as claimed in claim 9, wherein the filter has a length which substantially corresponds to a distance between the bottom and the lid of the container.

11. A container as claimed in claim 10, wherein the filter has a removable lid which is incorporated in the lid of the container.

12. A container having a removable lid, a bottom for receiving a tool which is drivable in the container by a motor, and a filter which is placeable in the container around the filter so as to divide the space in the container between a portion in the filter and a portion outside of the filter, said filter being held in a fixed position in the container during operation by locking said filter in between the bottom and the lid of the container, said filter being held in the fixed position in the container during operation by means of a supporting element and a positioning ring present between the filter and the lid of the container, and the bottom portion of said filter solely resting against the bottom of the container.

13. A container as claimed in claim 12, wherein the supporting element is integrated with a lid of the filter.

14. A container having a removable lid, a bottom for receiving a tool which is drivable in the container by a motor, and a filter which is placeable in the container around the filter so as to divide the space in the container between a portion in the filter and a portion outside of the filter, said filter being held in a fixed position in the container during operation by locking said filter in between the bottom and the lid of the container, said filter being held in the fixed position in the container during operation by means of a supporting element present between the filter and the lid of the container and the bottom portion of said filter solely resting against the bottom of the container, wherein the supporting element comprises a funnel via which a volume in the container enclosed by the filter can be filtered.

15. A container as claimed in claim 14, wherein the lid of the container comprises an opening via which the funnel is accessible.

16. A container as claimed in claim 14, wherein the funnel is integrated with a filter housing comprising filter elements.

* * * * *